UNITED STATES PATENT OFFICE.

WILLIAM DENNISON CLARK, OF PORTLAND, OREGON.

PRESERVATIVE TREATMENT OF TIMBER.

1,165,753.  Specification of Letters Patent.  Patented Dec. 28, 1915.

No Drawing.  Application filed July 3, 1914. Serial No. 848,939.

*To all whom it may concern:*

Be it known that I, WILLIAM DENNISON CLARK, a citizen of the United States, and a resident of the city of Portland, county of Multnomah, State of Oregon, have invented a certain new and useful Improvement in Preservative Treatment of Timber, of which the following is a specification.

My invention relates to the treatment of timber by a liquid preserving agent so as to prevent decay and the attack of insects; and the object of my invention is to effect economy by preventing avoidable waste of preserving material in said treatment. For example, piling requires protection only of certain parts, and the application of the preserving material should be limited to such surfaces. I attain my object by coating with a resisting paint-like substance the more porous surfaces, or the surfaces which are to resist more or less the penetration of the preserving material, preferably using a substance especially compounded for such purpose and consisting of the following ingredients: commercial magnesite or magnesium oxid 40 parts, powdered auxiliary filler, including any coloring matter if desired 12 parts, solution of magnesium chlorid of the strength of about 35 degrees Baumé 48 parts.

I prefer to use for the auxiliary filler commercial asbestine pulp, which, as known, contains silicate of magnesium, the latter being an ingredient which I find necessary to use in order to obtain good results; but, of course, I do not wish to be understood as limiting myself to asbestine pulp, since other compounds which consist in part of silicate of magnesium may be used. When coloring matter is used, I find it advantageous to use of the latter only about two parts to about ten parts of asbestine pulp, or other compound containing silicate of magnesium. The solid matter is in the first instance thoroughly intermingled, and the chlorid solution is added shortly before using. The strength of this preservative-resisting material is to be varied relatively to the degree of resistance the preservative-resisting material is to exert against the penetration of the preserving material into the timber being treated; and such variation in strength may be accomplished by increasing and decreasing the strength of the chlorid solution, or by increasing or decreasing the quantity of auxiliary filler, and relatively decreasing or increasing the quantity of the magnesium oxid. The coloring matter is added in order to insure uniformity of color of those surfaces of the timber painted with my preservative resisting material in comparison with the other surfaces after the timber has been subjected to the preservative treatment. I preferably use as the coloring matter black manganese or drop black.

The coating is applied by brush or spray to the surfaces which are to resist the penetration of the preserving material.

A particularly beneficial result is attained by my improved process, in connection with the preservative treatment of timber having unequal porosity, for example, the ends and the sides of railroad ties. Under such conditions the penetration of the preserving material is rendered more uniform and equal, for by painting the more porous surfaces the resistance to penetration of such surfaces may be made more equal to that of the remaining surfaces.

The compound above described is preferably used since it has the property of resisting solution by a preserving agent such as creosote, now commonly and preferably employed.

In the treatment of piling and green timber I use the following process: I first immerse the timber—preferably boil the same—in the preserving liquid for the purpose of driving out, in part, the moisture of the timber, in other words, artificially seasoning the timber. I then withdraw the timber from the immersion, then paint those surfaces of the timber which are to resist the penetration of the preservative liquid, and finally replace the timber in the preserving liquid and submit to pressure, so as to force the preserving liquid to penetrate those surfaces which have not been previously painted.

I claim—

1. In the preservative treatment of timber, the method of controlling the penetration of the preserving material into the timber which consists in coating the surfaces which are to resist the penetration of the preserving material with a substance capable of resisting solution by the preserving agent, said coating being applied previous to an immersion of the timber in the preserving material.

2. In the preservative treatment of timber, the method of controlling the penetration of the preserving material into the timber which consists in coating the surfaces which are to resist the penetration of the preserving material with a substance compounded of magnesium oxid, magnesium silicate and magnesium chlorid, substantially as set forth.

3. In the preservative treatment of timber the method of controlling the penetration of the preserving material into the timber which consists in coating the surfaces which are to resist the penetration of the preserving material with a compound made of oxid of magnesium, a mineral auxiliary filler including magnesium silicate and a solution of magnesium chlorid, substantially as described; the proportion of the oxid, the filler and the chlorid solution being varied relatively to the degree of resistance, to the preserving agent, desired to be imparted to the surfaces coated by said compound.

4. In the preservative treatment of timber, the method of first immersing the timber in the preserving liquid, for the purpose of artificially seasoning the same, then withdrawing the timber from the preserving liquid, then painting the surfaces which are to resist further penetration of the preserving liquid, then replacing the timber in the preserving liquid and submitting to pressure, to thereby force the penetration of the preserving liquid into those surfaces which have not been painted.

5. In the preservative treatment of timber, the method of first boiling the timber in a preserving liquid, for the purpose of artificially seasoning the same, then withdrawing the timber from the preserving liquid, then painting the surfaces which are to resist further penetration of the preserving liquid, then replacing the timber in the preserving liquid and submitting to pressure, to thereby force the penetration of the preserving liquid into those surfaces which have not been painted.

WILLIAM DENNISON CLARK.

Witnesses:
WM. U. SCHMITT,
CECIL LONG.